US011250195B2

United States Patent
Lee et al.

(10) Patent No.: US 11,250,195 B2
(45) Date of Patent: Feb. 15, 2022

(54) METHOD AND SYSTEM FOR ROM BASED DYNAMIC THERMAL MANAGEMENT ANALYSIS AND CONTROL

(71) Applicant: ANSYS, Inc., Canonsburg, PA (US)

(72) Inventors: Myunghoon Lee, Gyeonggi-do (KR); Vamsi Krishna Yaddanapudi, Maharastra (IN); Aniket Abhay Kulkarni, Pune (IN)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 16/947,756

(22) Filed: Aug. 14, 2020

(65) Prior Publication Data

US 2021/0264086 A1    Aug. 26, 2021

Related U.S. Application Data

(60) Provisional application No. 62/980,603, filed on Feb. 24, 2020.

(51) Int. Cl.
| | |
|---|---|
| *G06F 30/30* | (2020.01) |
| *G06F 30/367* | (2020.01) |
| *G06F 111/10* | (2020.01) |
| *G06F 119/06* | (2020.01) |
| *G06F 119/08* | (2020.01) |

(52) U.S. Cl.
CPC ........ *G06F 30/367* (2020.01); *G06F 2111/10* (2020.01); *G06F 2119/06* (2020.01); *G06F 2119/08* (2020.01)

(58) Field of Classification Search
CPC ............... G06F 30/367; G06F 2111/10; G06F 2119/08; G06F 2119/06
USPC ........................................................ 716/109
See application file for complete search history.

(56) References Cited

U.S. PATENT DOCUMENTS

2008/0072182 A1*   3/2008   He ........................... G06F 30/39
                                                                    716/113

* cited by examiner

*Primary Examiner* — Jack Chiang
*Assistant Examiner* — Brandon Bowers
(74) *Attorney, Agent, or Firm* — Womble Bond Dickinson (US) LLP

(57) ABSTRACT

Machine assisted system and method for performing dynamic thermal management (DTM) analysis are described. In one embodiment, the method can include receiving a power profile associated with IP blocks in an integrated circuit (IC) system modeled by a Krylov reduced order model (ROM). The power profile can represent power consumption of each of the blocks based on a predefined operating scenario. The method can additionally include evaluating the temperature of each of the blocks of the IC system for the current time step based on the power profile and the Krylov ROM. The method can further include calculating new power values based on the current temperature field of each of the blocks of the IC system, wherein the power profile can be updated with the new power value for the temperature of each of the blocks of the IC system for the next time step.

22 Claims, 17 Drawing Sheets

Python code for DTM

```
import OS
#Enter the list of IP's that are needed to be included in DTM
module_list = ['BIG','GPU','NPU','ISP','SRAM']  ─────────────────── PUT IP NAME HERE
module_base_power = [3.0,0.0,0.0,0.0,0.0]  ─────────── PUT POWER FOR EACH IP
#Enter the Minimum Time
TIME_RESOLUTION = 0.1  #minimum time resolution
#Set to zero if filed data is not requered and '1' if field data is required
write_field_data = 1  ─────────────── IN CASE OF WRITING FIELD DATA, PUT "1" IF NOT, PUT "0"
##KRYLOV FIELD DATA START AND END TIME. Field data will be written for time steps in between
Krylov_data_start_time = 0  }─────── 'PUT START TIME AND END TIME
Krylov_data_end_time = 180  }         FOR FIELD DATA WRITING'
#Frequency of Data Writing
field_data_write_frequency = 2

#Calculate the Power of Module based On Temperature
def calculate_power(module_name,module_temperature):
    for index,items in enumerate(module_list):
        if module_name == items:
            break
    #just do a simple check based on Temperature
    print (index)
    print (module_base_power[index])
    if module_temperature <= 323.15:
        module_power = module_base_power[index]
    elif module_temperature >=323.15 and module_temperature <=333.15:
        module_power = module_base_power[index]*1.0
    elif module_temperature >=333.15 and module_temperature <=343.15:
        module_power = module_base_power[index]*1.0
    elif module_temperature >=343.15 and module_temperature <=353.15:
        module_power = module_base_power[index]*1.0
    else:
        module_power = module_base_power[index]*1.0
    return module_power
```

USER CAN MODIFY THERMAL MANAGEMENT LOGIC BASED ON TEMPERATURE OF ITS IP'S TEMPERATURE

FIG. 3

```
#Function to Modify Timestep if needed from Python
#Vairable time step input by MH.Lee
def write_time_step():
    if cur_time <1.0:                   ⎫
        time_step=0.01                  ⎪ USER CAN PUT VARIABLE TIME
    else:                               ⎬ STEP INPUTS BASED ON
        time_step=0.1                   ⎪ SIMULATION TIME
    file = open("time_step_info.txt","w")⎭
    file.write(str(time_step))
    file.close()

while cur_time < end_time:
    for module in module_list:
        #Temperature Calculation
        module_temperature = get_temperature(module)

#Now Calculate the Power of the Module based on Temperature
        Module_power = calculate_power(module,module_temperature)

#Write Power
        write_Power_for_module(module,module_power,module_temperature, cur_time)

#Write Power Input file
        write_power(module,module_power)

print (cur_time,module,module_power,module_temperature)

#Now check if mon point is above threshiold
    if cur_time>180:          ──── 'PUT END TIME OF DTM SIMULATION
        write_dtm_stop_file()

write_time_step()
    cur_time = cur_time+TIME_RESOLUTION
```

FIG. 3 (CONT.)

|  | Running time (Min) | Temperature At 60 sec |
|---|---|---|
| Icepak 3D TR | 61 | 99.85 |
| Krylov ROM | 11 | 96.38 |
| Comparison | 5.55 | 3% |

Krylov + DTM workflow

```
ANSYSDTM.py
413  while not os.path.exists('stopDTM.txt'):
414      try:
415          p = subprocess.Popen('python '+workingDir+'Icepak_Example.py ',stdout=subprocess.
                 PIPE,stderr=subprocess.PIPE,shell=True)
416      except:
417          print ('There is Some Problem with External Python Routine.Please check\n')
418
419      stdout, stderr = P.communicate()
420      if p.returncode != 0:
421          print (stderr)
422          print ('There is Some Problem with External Python Routine. Please check\n')
423          sys.exit()
424      print (stdout, '\n')
425      T,x,dt = ROMeval (pow_list,x,area_list)
426      writeTempFile(pmonList,workingDir_T,time,monitorIndex)
427      #Print the Power Value
428      print('Simulation Time    '+str(round(time,2))+" [s]\t"+" \t Max
              temperature  "+ str(round((max(T)[0]-273.15),2))+" [Degrees Centigrade]")
429      time = time +dt[0][0]
430  print ("End of DTM time loop \n")
431
432
433  #Now Call ROM Evaluation from Rom Evaluation
434
435  print ("Executing ROM Evaluation for writing the Filed data")
436
437  #Now start Evaluating Krylov Filed data generation
438  #Read Configuration file to understand if Field data needs to be written and frequency
         of filed data generation
439  read_configuration_file(workingDir)
440
```

- Start user python code
- Do ROM evaluation to calculate the temperature given power value
- if the user wants to have field data as output then start the same (code continued in next slide)

Krylov + DTM Workflow

```
439  read_coniguration_file (workingDir)
440
441  if write_field_data > 0:
442      #start from Here.Get ID Module list and base name
443      base_name,ip_module_list = get_ip_module_list(workingDir)
444      #Get Area List
445      ip_module_area_dict = get_area_ip_list(workingDir,ip_module_list)
446      rom_order,case_file,data_file = get_rom_details(workingDir,base_name)
447
448
449      for items in ip_module_list:
450          power_history[items] = [ ]
451
452      update_module_power(ip_module_list,ip_module_area_dict)
453      write_krylov_rom_inputfile(base_name,trans_sol_id,power_history,rom_order,len(ip_module_list),ip_module_list,ip_module_area_dict)
454      run_krylov_rom((os.path.join(workingDir,base_name)+".KrylovEval Input"))
455      #Copy krylov Files
456      copy_krylov_files(workingDir,base_name,trans_sol_id)
457
458
459
460
```

{ Get essential details about ROM (lines 442-446)

{ Do field evaluation and copy the files into working directory (lines 452-456)

METHOD AND SYSTEM FOR ROM BASED DYNAMIC THERMAL MANAGEMENT ANALYSIS AND CONTROL

This application claims the benefit of the filing date of U.S. provisional patent application No. 62/980,603, filed Feb. 24, 2020 and entitled Method and System for ROM based Dynamic Thermal Management Analysis and Control, and this provisional patent application is hereby incorporated herein by reference.

BACKGROUND

Global system semiconductor market is growing explosively to meet the trend of emerging technologies like Artificial Intelligence (AI), Augmented Reality (AR), 5G communication, Internet of Things (IoT), and Autonomous applications. The trend requires a high power density application with rapid switching needs of leading-edge application processor (AP) to maximize dynamic performance for various scenarios. Dynamic Thermal Management (DTM) technology is critical to support the high power density application with rapid switching.

DTM technology can be used to control a CPU power dissipation of a smart device (e.g., smartphone) by sensing the temperature of a component (e.g., Chip Die or screen glass) of the smart device. The Application Processor (AP) IC of the smart device can include multiple functions and may require a high power to support the multitasking capabilities of the smart device. The high processing power needed to control these multitasking capabilities can generate more heat. The generated heat can degrade the performance of the battery, accelerate the limitations of the AP's performance, and lead to AP's functional loss in the worst case. For example, if temperature of the IC exceeds 80 degrees Celsius, the temperature of the IC's performance needs to be reduced to protect the AP IC. DTM technology can include two components including sensing the temperature and controlling the power based on the temperature sensing DTM algorithm. Temperature sensing can be achieved by a distributed sensor placement throughout the IC packages and any location where is thermally important. The sensor placement is critical on-IC for a better power management. Smart phone AP IC can have various operating scenarios such as CPU scenario. For example, when a user uses a browser on the smartphone to browse a webpage, the CPU has to do so many works, and the CPU area may generate high power indicated by thermal hot-spots. Various operation scenarios of the smartphone can lead to the moving around thermal hot-spots. The questions are how many sensors can be placed based on the moving hotspots and how quickly and accurately to predict them. The moving around thermal hot-spots may require distributed temperature sensors around the device, especially at critical locations such as, processors, cameras, and antennas. Optimizing the placement of the temperature sensors to prevent overheating while maximizing the functionality of the smartphone may require 3D simulation. 3D simulations can be used to understand how the design will perform thermally or why it fails. 3D simulations can also provide insight if the modifications work better when the design is changed.

Commercial CFD (Computational Fluid Dynamics) technology and Reduced Order Model (ROM) formulations can provide such simulation, such as DTM simulations. However, it can be technically challenging to predict dynamic thermal performance in these existing approaches. For example, 3D transient CFD may be applied to generate highly accurate simulation results but it may require unacceptable computing resources (e.g. too slow) to cover various scenarios. Alternatively, linear and time-invariance reduced order model (LTI ROM) technologies can allow speedy simulations to provide data monitoring information but incapable of sensing where the hot-spot is placed in a system. Although LTI ROM is fast, the LTI ROM technologies are limited to only monitor point data. LTI ROM technologies require predefined monitor points, therefore, a moving hotspot would be a concern. Additionally, Krylov reduced order model (ROM) approach can provide accurate and temperature field data but it does not provide flexibility to call external routine. ROM evaluation is also slow due to usage of Fluent for the input and output process.

Thus, Applicants have recognized that there is a need for a system, software, and methods to improve the shortcomings of CFD, LTI ROM, and Krylov ROM technologies discussed above.

SUMMARY OF THE DESCRIPTION

In view of the foregoing, various embodiments of the present disclosure can provide for improved system, software, and methods for a mechanism to perform dynamic thermal management (DTM) analysis, e.g., for Electro/Electric System with Multiple Die Integration (MDI) package. For instance, some embodiments of the mechanism can include applying a Krylov ROM based on an external control (e.g., implemented with a Python code.). The mechanism can involve a co-simulation with Krylov ROM and Python logic. The external control may include an algorithm configured in consideration of temperature dependent power modeling and various operating scenarios. The mechanism (e.g., feedback mechanism) provided by a data plug can enable the power to be changed dynamically. The mechanism can provide a flexibility to select control logic and time step size while the simulation is running. The mechanism can also provide a platform to integrate any external control with Krylov ROM. For every time step (e.g., 1 s) during a simulation time (e.g., 1 hour), temperature field can be calculated all over the IC. Based on the calculated temperature field, a maximum temperature can be obtained and returned to the external control (e.g., power profile manager) to update the power. With the updated power, a new temperature field can be calculated. In this manner, the data plug can provide a feedback mechanism to Krylov ROM evaluation. Accordingly, the mechanism can enhance the processing time for a DTM analysis and provide a flexibility for a time step size and selection of points.

A computer-implemented method according to one embodiment described herein. A power profile associated with blocks in an integrated circuit (IC) system modeled by a Krylov ROM (reduced order model) can be received. The power profile can represent power consumption of each of the blocks based on a predefined operating scenario. A temperature of each of the blocks of the IC system can be calculated for a current time period based on the power profile and the Krylov ROM. New power values can be calculated based on the calculated temperature of each of the blocks of the IC system. The power profile can be updated with the new power values for the temperature of each of the blocks of the IC system for a next time period.

In one embodiment, the power profile associated with the blocks in the IC system can be received from a power profile manager implemented as a script for a simulation of the IC system. The power profile manager can be coupled to a temperature generator via a data plug. A dynamic thermal management (DTM) workflow including the Krylov ROM can be invoked to perform a DTM analysis to perform a simulation of the IC system and process the received power profile associated with the blocks in the IC system according to a Krylov ROM. The calculating of the temperature can include generating results that indicates thermal hot-spot locations of each of IP blocks of the IC system based on the received power profile associated with the blocks in the IC system from the power profile manager.

In one embodiment, the calculated temperature fields can be returned to the power profile manager associated with the blocks in the IC system via the data plug. Additionally, the calculated new power values can be returned to Krylov ROM for the next time period via the data plug.

In some embodiments, a preselected time step value can be received by the data plug during the simulation. Krylov evaluation performed by the temperature generator and the power profile generator can be synchronized by the data plug. The temperature generator and the power profile generator can have the same preselected time step value during the simulation.

In one embodiment, the generated Krylov ROM can be reused with one or more different power profiles and simulation time-points.

In some embodiments, a plot of temperature and power history including temperature field for each time step of each IP block and hot-spot location can be generated. The power profile can include time-dependent power values applied uniformly to selected regions of a device and the calculated temperature can include time-dependent temperatures of selected points in space occupied by the device.

In one embodiment, the DTM analysis can be performed according to predefined instructions. The predefined instructions can include specifications of power sources for a predefined scenario and settings for the DTM analysis.

Any of the above methods can be embodied on a non-transitory computer-readable medium programmed with executable instructions that, when executed, perform the method. The instructions can be stored in nonvolatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limited in the figures of the accompanying drawings in which like references indicate similar elements.

FIG. 3 is an example of Python code for implementing DTM analysis according to one embodiment.

FIG. 8A-8D show example of Krylov and DTM workflow implemented using Python code according to one embodiment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
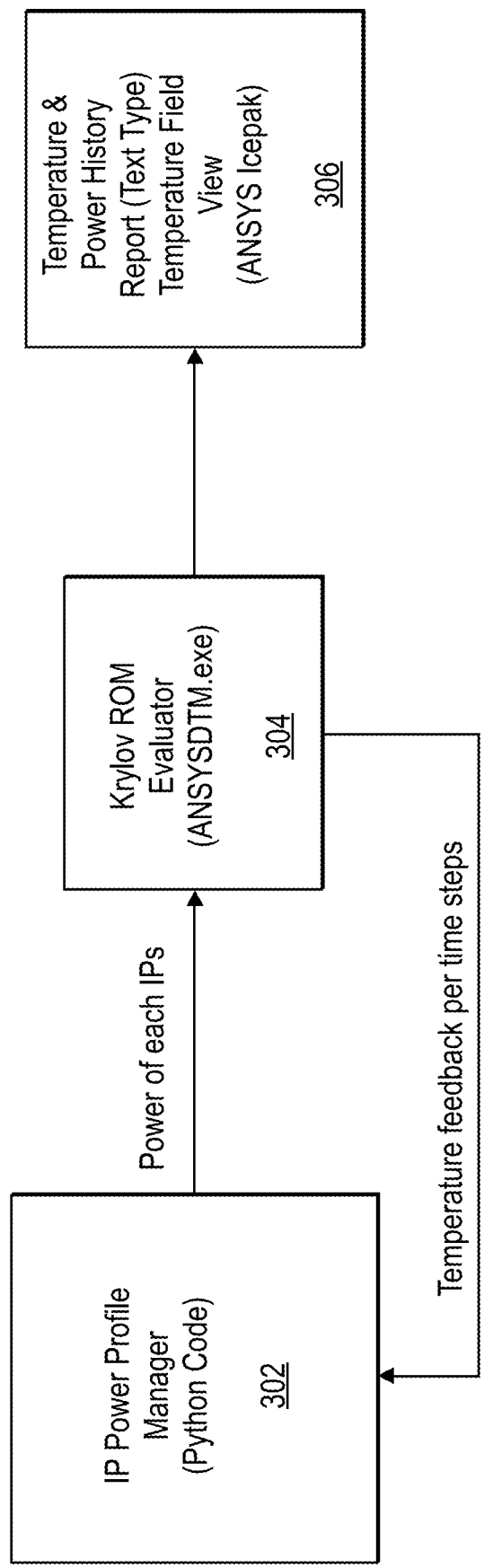
FIG. 1 is a block diagram which illustrates an overview mechanism implemented by the systems and methods according to one embodiment.
Figure 4A:
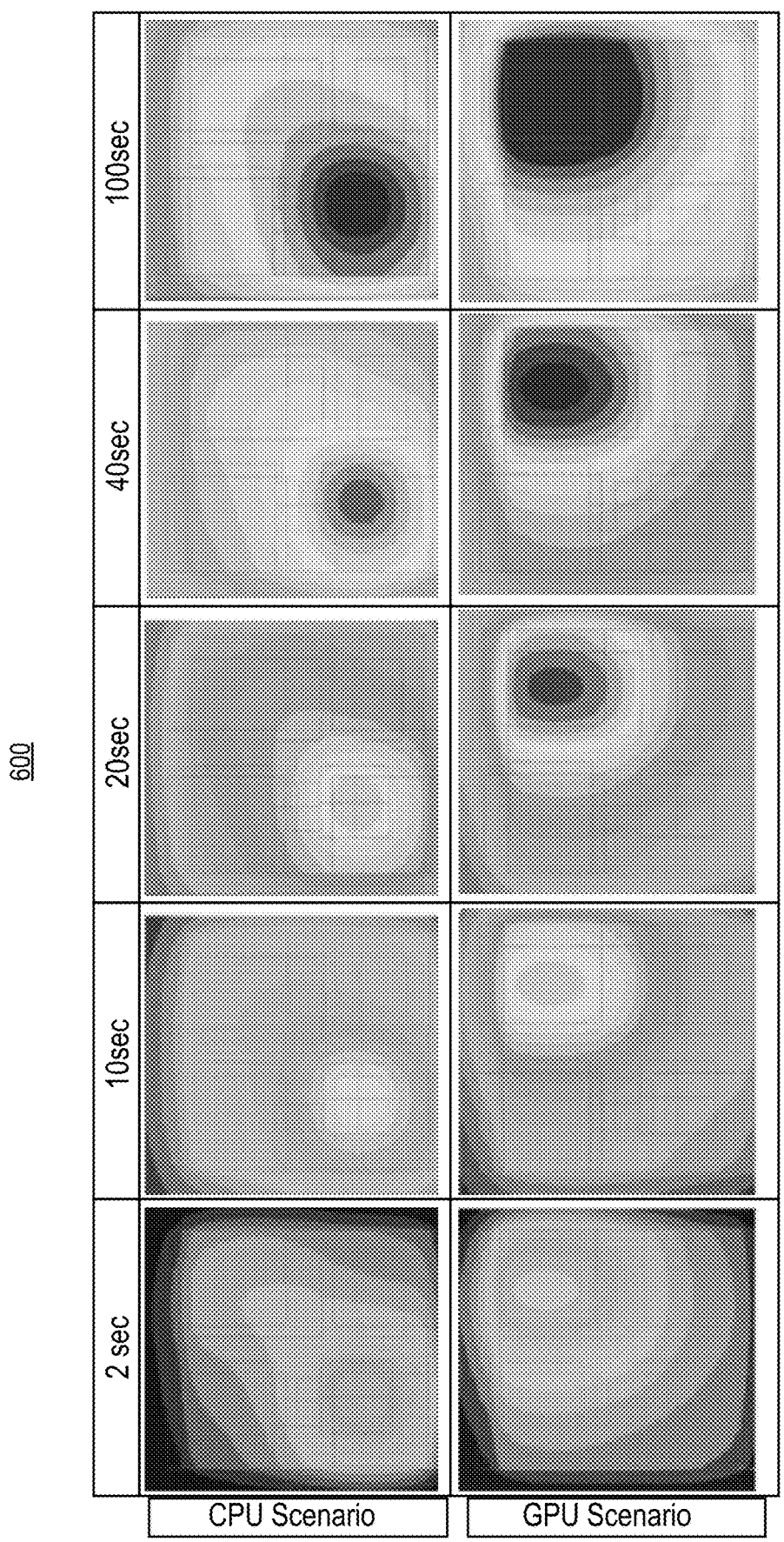
FIG. 4A shows a time-varying heat distribution for CPU scenarios according to one embodiment.
Figure 4B:
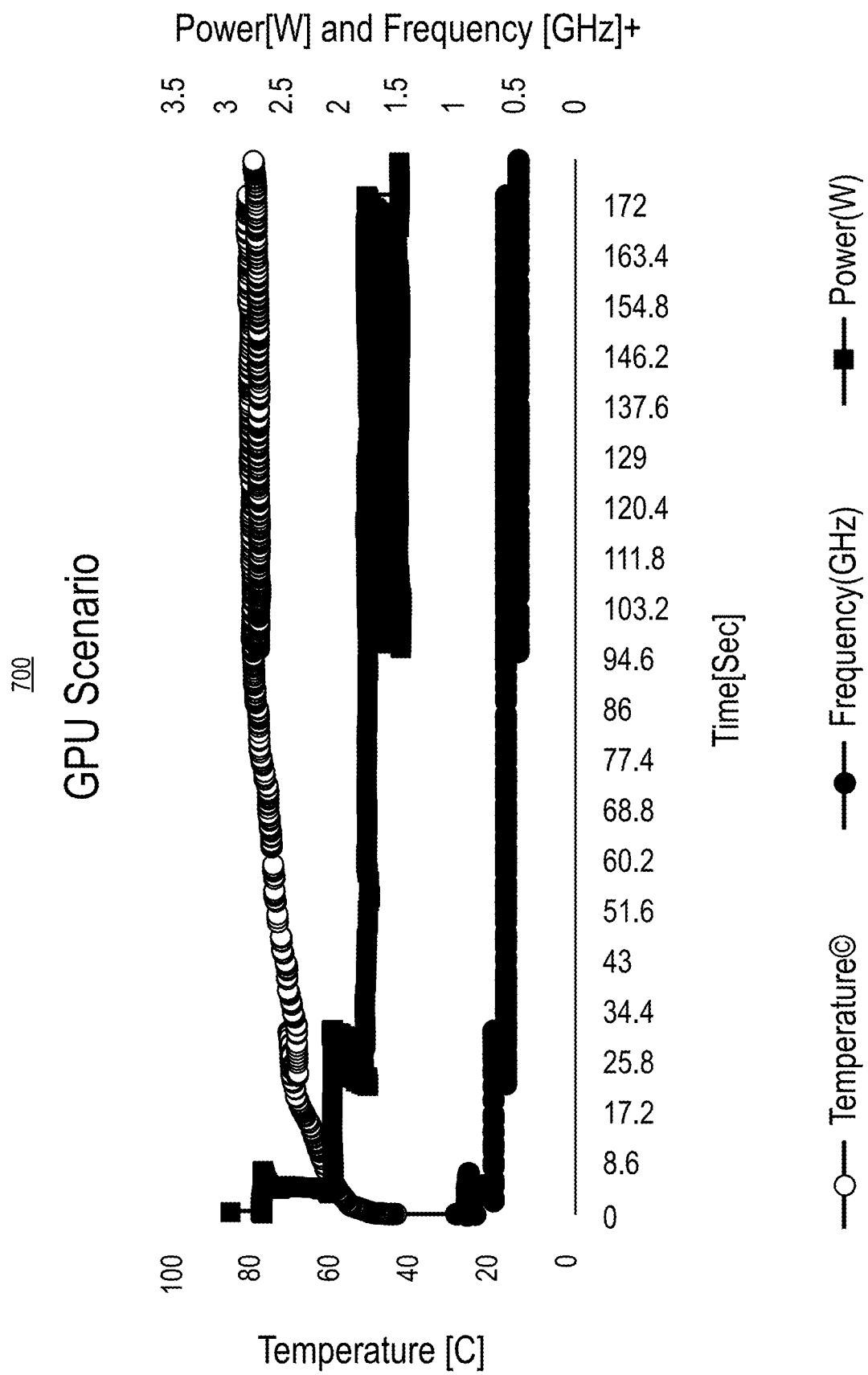
FIG. 4B shows an example of a plot of temperature as a function of temperature, frequency, and power according to one embodiment.

Systems and methods are disclosed for performing a Dynamic Thermal Management (DTM) analysis which can allow a user to define each power profile of each IP block in a circuit or chip system as a function of temperature and time. An IP block may correspond to a functional unit of logic in a chip, for example, representing a semiconductor intellectual property core, IP core, cell, or integrated circuit layout design, as will be understood by those skilled in the art. FIG. 1 illustrates an exemplary block diagram which depicts an overview of a mechanism implemented by the systems and methods according to one embodiment. Referring to FIG. 1, the disclosed mechanism can include a DTM executable 304 invoked according to a workflow. A control module (e.g. implemented in a script based code, such as Python) can be executed as IP power profile manager 302 to invoke the DTM executable 304 including a Krylov ROM for a power evaluation process to simulate a circuit system. The DTM workflow including the Krylov ROM (e.g., 304) can be invoked to perform a DTM analysis to perform a simulation of the IC system and process the received power profile associated with the blocks in the IC system according to a Krylov ROM. Application Processor (AP) chip can include a large number of IP blocks performing multiple functions (e.g., CPU, GPU, AI, 5G modem) and each of the IP blocks can have its own power profile based on the operating scenario. In some scenarios, CPU block can have its own power profile. In another scenario, GPU block can have its own power profile. In some other scenarios, multiple blocks can have some power profiles. Each power profile can be a function of temperature, voltage, and frequency as depicted in FIG. 4B. FIG. 4B illustrates a multi-variable plot 700 of a varying frequency, power, and temperature with respect to time for a GPU scenario. The temperature, voltage, and the frequency can determine the power indicated in the profile. The temperature, voltage, and the frequency can be varied based on the time marching (e.g., increment of time). Accordingly, higher voltage and higher frequency can increase the power consumption leading to higher temperature. As illustrated in FIG. 4A, the thermal hot-spot location for each IP block (e.g., CPU, GPU) can vary with time according to the operating scenario. FIG. 4A illustrates the thermal hot-spot location 600 for a CPU and a GPU scenario observed at several times (e.g., 2 s, 10 s, 20 s, 40 s, and 100 s). Each block can consume electrical power and this electrical power can generate heat that can increase the temperature of each of the IP blocks. The power profile associated with the blocks in the IC system can be received from the IP power profile manager 302 implemented as a script for a simulation of the IC system. The power profile manager can be coupled to a temperature generator via a data plug 1020 (see FIG. 6). Further details regarding the data plug 1020 will be provided below including the description associated with FIG. 6 below. Results of the simulations 306 can include temperatures field data for the system and can be viewed on Ansys Icepak Thermal and Fluid Flow Solver. The results of the simulations 306 can include temperature and power history reports available as a text. In one embodiment, the temperature and power history can include temperature field for each time step of each IP block and hot spot location.

Simulations based on Krylov ROM can capture hot-spot locations of chip die with temperature field data. Results of the simulations based on the Krylov ROM may be sent back to the IP power profile manager 302. As depicted in FIG. 1 in one embodiment, the calculated temperature fields can be returned to the IP power profile manager 302 associated with the blocks in the IC system. Additionally, the calculated new power values can be returned to Krylov ROM via the data plug for the next time period. The disclosed mechanism can indicate or sense hotspot locations in a chip. For example, the calculating of the temperature can include generating results that indicate thermal hot-spot locations of each of the IP blocks of the IC system based on the received power profile associated with the blocks in the IC system from the power profile manager.

Figure 2:
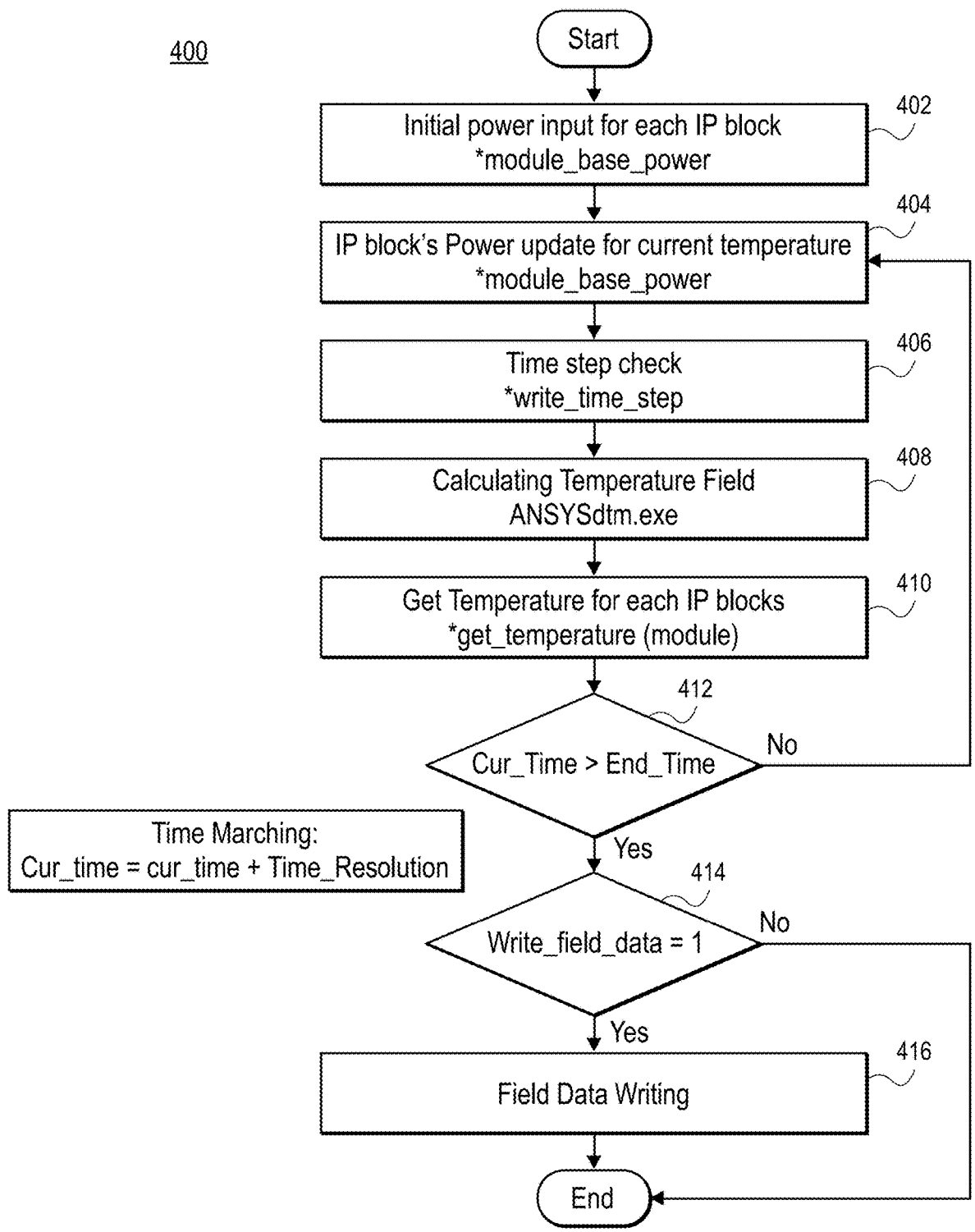
FIG. 2 shows a flowchart of an example method for a mechanism to perform dynamic thermal management (DTM) analysis according to one embodiment.

FIG. 2 is a flowchart of a method 400 for performing a DTM analysis, according to some embodiments of the present disclosure. Method 400 can be performed by one or more processors that is executing computer code stored in computer-readable memory of a processing system illustrated in FIGS. 11A-11B that will be described below in detail. At block 402, an initial power input for each IP block can be received. In some embodiments, the initial power input can be received by executing module_base_power of a Python code as shown in FIG. 3. A Python code, such as code 500 discussed herein with respect to FIG. 3, can be executed to receive the initial power input from the IP power profile manager (e.g., 302 in FIG. 1). At block 404, module_base_power code of the Python code 500 can be executed to update IP block's power for a current temperature. At block 406, function write_time_step can be executed to check time step. At block 408, temperature field can be calculated by executing an executable program ANSYSdtm.exe. Ansys DTM Platform (ANSYSdtm.exe) can be developed for system on a chip's (SoC) Dynamic Thermal/Power Management Simulator in a mobile device. At block 410, the temperature for each IP block can be obtained by executing module get_temperature. At block 412, it can be determined whether Cur_Time exceeds End_Time in function write_time_step. Note that cur_time=cur_time+Time_Resolution. Cur_time can represent the time marching for a new power update and a next temperature calculation. Time marching can be performed until the simulation reaches the End_time that has been configured for the simulation. If it is determined that Cur_Time does not exceed End_Time, the method can proceed to the block 404 until it is determined that Cur_Time exceeds End_Time. After it is determined that Cur_Time exceeds End_Time, it can be determined at block 414 whether field data are required to be written. Write_field_data can be set to 1 if the field data are required to be written. At block 416, the field data can be written. If it is determined that the field data are not required to be written, the method 400 ends.

In one embodiment, the disclosed mechanism can include (1) calculating (e.g. via Krylov ROM) temperature (e.g. for temperature fields) for initial time step with initial power. The mechanism can also include (2) updating (e.g. via IP power profile manager) new power of each IP block based on time and temperature information of each IP block. Additionally, the mechanism can include (3) calculating (e.g. via Krylov ROM) temperature for the next time step. Further, the mechanism can include (4) performing time marching for new power update and next temperature calculation (steps 2 and 3) till end of time configured for a simulation.

FIG. 3 shows a Python code 500 for implementing DTM analysis according to an embodiment. The Python code 500, when implemented, can allow the user to specify the IP block name, the power for each of the IP blocks, the indication to write field data, and the start time and end time for the field data writing. The Python code 500 can also allow the user to modify thermal management logic based on temperature of its IP's temperature. The user can specify variable time step inputs based on the simulation time. The user can specify end time of the DTM simulation.

Figure 6:
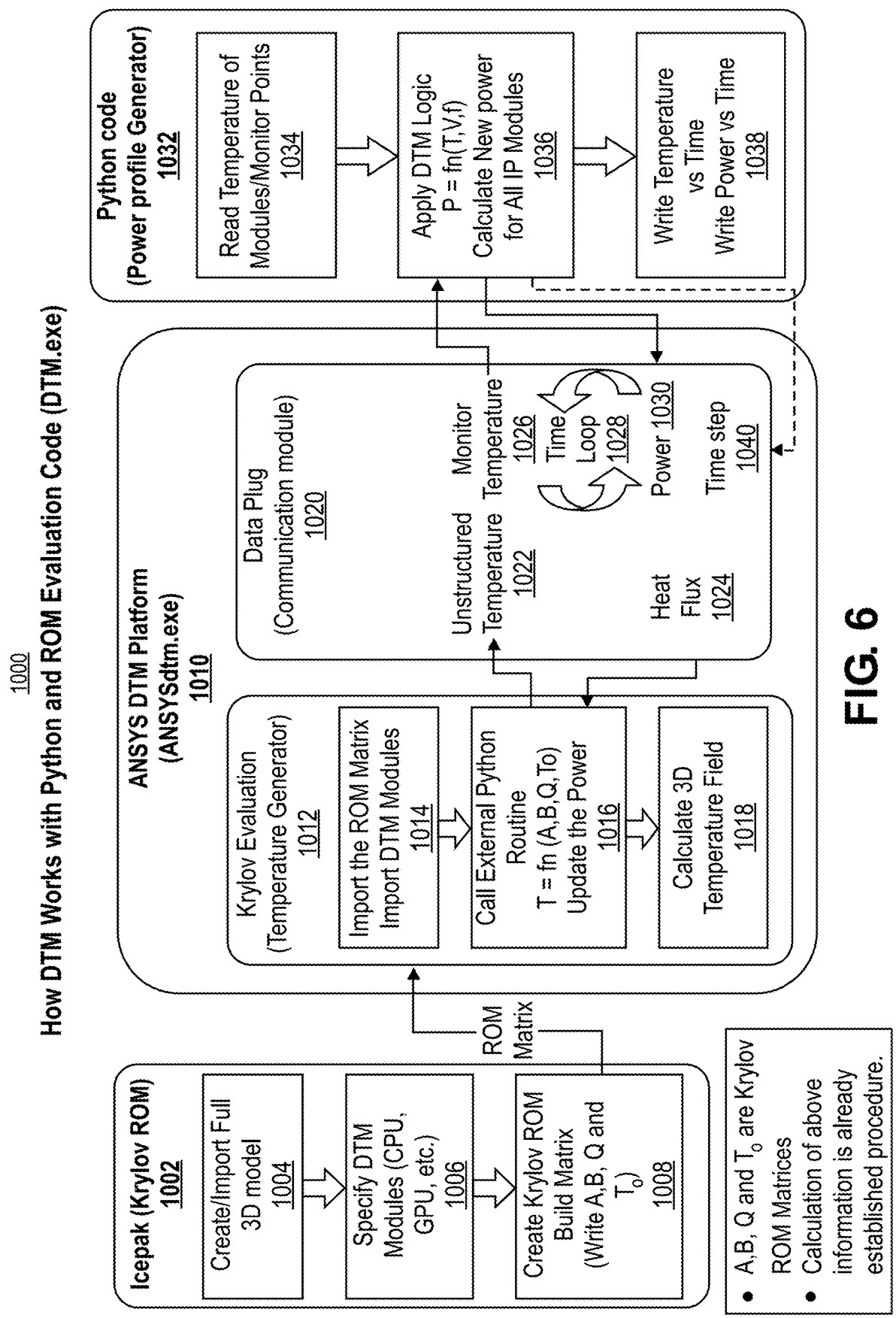
FIG. 6 shows a flowchart of an example mechanism of how DTM works with Python code and ROM evaluation code according to one embodiment.

FIG. 6 is a flowchart of an example mechanism of how DTM works with Python code and ROM evaluation code. In one embodiment, a mechanism (e.g., 1000) as depicted in FIG. 6 can include a workflow for a system level dynamic thermal performance analysis to receive (e.g. via importing) a thermal model or a package model (e.g. a smartphone model), generating a corresponding Krylov ROM for simulating the package model received, and invoking a script (e.g. based on Python code) to perform simulation for given power management scenario. For example, at block 1004, Ansys Icepak fluid flow software 1002 can create or import a full 3D model. In order to generate ROM model, a full 3D geometry can be required to generate input data to the model so the model can understand the behavior of the system. At block 1006, DTM modules such as CPU, GPU, etc. can be specified. At block 1008, Krylov ROM matrix can be created. ROM matrix can be built by writing A, B, Q, and $T_o$. Note A, B, Q, and $T_o$ are Krylov ROM matrices, as will be understood by those skilled in the art.

As further illustrated in FIG. 6, Ansys DTM Platform 1010 can be implemented by executable ANSYSdtm.exe and can include a temperature generator 1012 and a data plug 1020. At block 1014, temperature generator 1012 can import the created Krylov ROM matrix and the DTM modules. The imported Krylov ROM then can be used for a temperature field calculation with initial power. Ansys DTM platform 1010 can calculate the temperature of monitored points which can then be used for each IP module's power update. Ansys DTM Platform 1010 can keep running a time loop 1028 until end of time of the simulation. The temperature generator 1012 can be configured to perform Krylov evaluation in order to calculate temperature field. The data plug 1020 can act as a communication module to coordinate the communication between Ansys DTM Platform 1010 and the Power Profile generator 1032 which can be implemented by Python Code. The power profile generator 1032 can be coupled to the Ansys DTM Platform via the data plug 1020. The power profile generator 1032 can generate power profile having power information of each IP block based on the operating scenario. Power profile can be returned to Ansys DTM Platform 1010 via the data plug 1020 for Krylov evaluation. Ansys DTM Platform 1010 can calculate the temperature based on the supplied power profile by the power profile generator 1032. The calculated temperature can be returned to the power profile generator 1032 via the data plug 1020 and the power profile generator 1032 can update the power profile for the next temperature simulation at the next time period. The power-temperature calculation loop can end when the predefined simulation time has been reached. 3D temperature field can be obtained so hot-spot for the scenario can be analyzed.

In one embodiment as depicted in FIG. 6, data plug 1020 can be configured as a connector between the power profile generator and Ansys DTM Platform 1010. In one embodiment, data plug 1020 can calculate the latest temperature value from existing data. Data plug 1020 can couple the Python code (e.g., power profile generator 1032) and the ROM (temperature generator 1012). Data plug 1020 can read power segregated files such as some files that can include power to be applied to CPU, GPU, or IP blocks. Data plug 1020 can also read the area file to convert power [W] to heat flux (W/m2). Data plug 1020 can additionally assign the correct heat flux 1024 to appropriate IP modules. Further, data plug 1020 can read the time step 1040 value and keep "Krylov evaluation" performed by temperature generator 1012 and "Python code" performed by the power profile generator 1032 in sync because the temperature generator 1012 and the power profile generator 1032 are separate routines. Both routines are required to have the same time step value during the simulation. Data plug 1020 can handle output data such as temperature. Additionally, data plug 1020 can read the monitor point locations from Icepak.pmon file. Data plug can take the unstructured temperature data 1022 and monitor points 1026 as input data and filter the correct value from the entire list. Unstructured temperature data 1022 can include temperature at all of the mesh points. From the filtered temperature, the temperature values can be written to files that the external Python file can read so the power profile generator 1032 can understand which temperature point to take for the next calculation.

In some embodiments, power profile generator 1032 can read temperature of modules or the monitor points at block 1034. At block 1036, DTM logic P=fn (T, V, f) can be applied. New power for All IP Modules can be calculated. The calculated new power 1030 for all IP modules can be received by the Ansys DTM Platform 1010 via the communication module 1020. The monitor temperature can be obtained from the Ansys DTM Platform 1010 via the communication module 1020. At block 1038, temperature as a function of time (temperature versus time) and power as a function of time (power versus time) can be written.

In one embodiment, at block 1014, the ROM Matrix and DTM modules can be imported. At block 1016, external Python routine, T=fn (A, B, Q, $T_o$) can be called and the power can be updated. At block 1018, 3D temperature field can be calculated. After the temperature generator 1012 had calculated the temperature field, commination module 1020 can receive unstructured temperature 1022.

Figure 7:
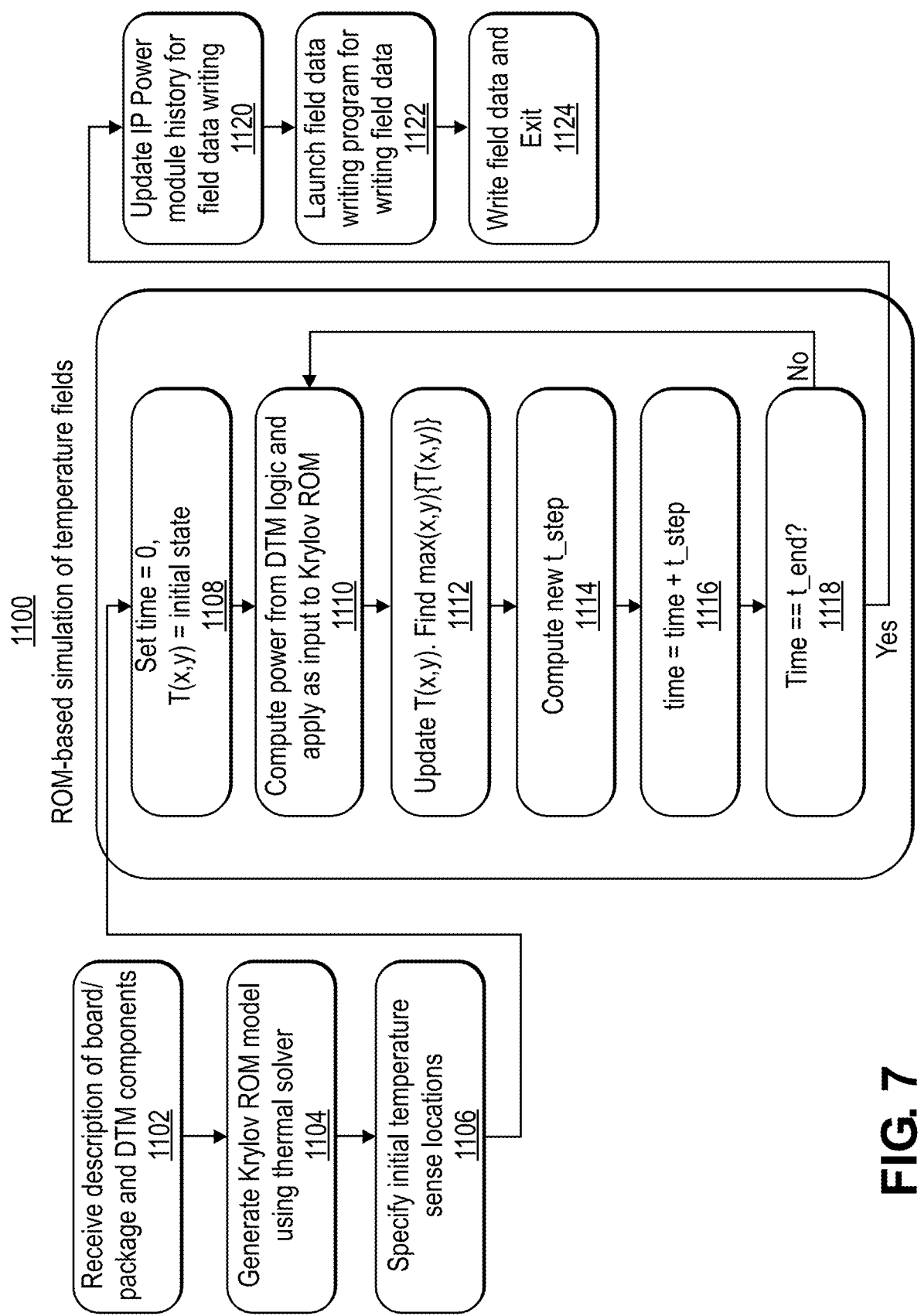
FIG. 7 illustrates a flowchart of an example process of ROM-based simulation of temperature fields according to one embodiment.

FIG. 7 is a flowchart of an example process of ROM-based simulation of temperature fields according to an embodiment of the present disclosure. At block 1102, IP modules participating in DTM components can be received. At block 1104, Krylov ROM model can be generated using a thermal solver. At block 1106, initial temperature for all IP modules can be specified. At block 1108, time can be set to zero and the temperature field, T (x, y) can be set to an initial state. At block 1110, power from DTM logic can be computed. The computed power can be applied as input to Krylov ROM. At block 1112, the temperature field, T (x, y) can be updated. A maximum temperature field can be determined at block 1112. The corresponding x and y of the temperature field can be recorded. At block 1114, new t_step can be computed. At block 1116, time can be updated by incrementing the t_step. At block 1118, if the time has not reached the t_end at block 1118, the process 1100 can return to block 1110. If the time has reached the t_end, IP Power module history for field data writing can be updated at block 1120. After block 1120, field data writing program can be launched to write field data at block 1122. At block 1124, the field data can be written and the process 1100 ends after the field data has been written.

Figures 5A, 5B:
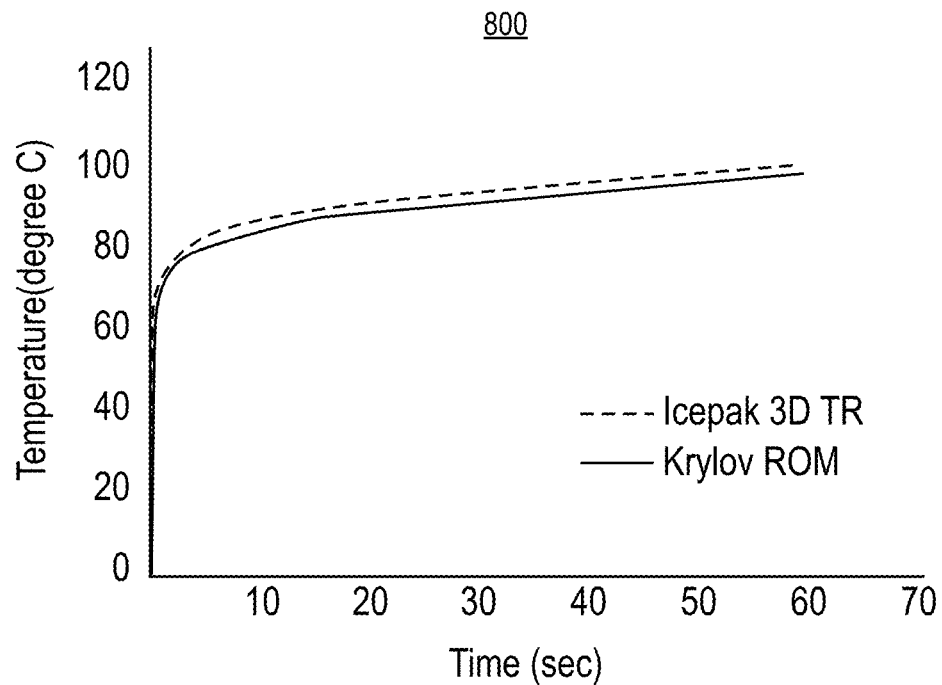
FIG. 5A shows an example of a plot of temperature as a function of time according to one embodiment.
FIG. 5B shows an example of a table comparing running time and temperature between Icepak-3D-TR and Krylov ROM according to one embodiment.

Referring to FIGS. 4A-4B and FIGS. 5A-5B, 3D simulation and DTM-Krylov ROM can be compared for a 60 s simulation time. FIG. 5A illustrates a plot 800 of the observed temperature as a function of time for the 3D simulation and the DTM-Krylov ROM. Applied power is constant (5 W) and there was no throttling power in the simulation. As illustrated in a table 900 in FIG. 5B, the 3D simulation took 61 minutes and DTM-Krylov ROM took 11 minutes to complete the 60 s simulation. The result of the simulation shows the DTM-Krylov ROM evaluation (using a single core) is 20 times faster than Icepak-3D-using 12 CPUs parallel computing). As depicted in FIGS. 5A and 5B, 3D simulation yielded 99.85-degree Celsius at the end of the simulation and DTM-Krylov ROM yielded 96.38-degree Celsius at the end of the simulation. The calculated error between the 3D simulation and DTM-Krylov ROM is 3%.

Figure 8A:
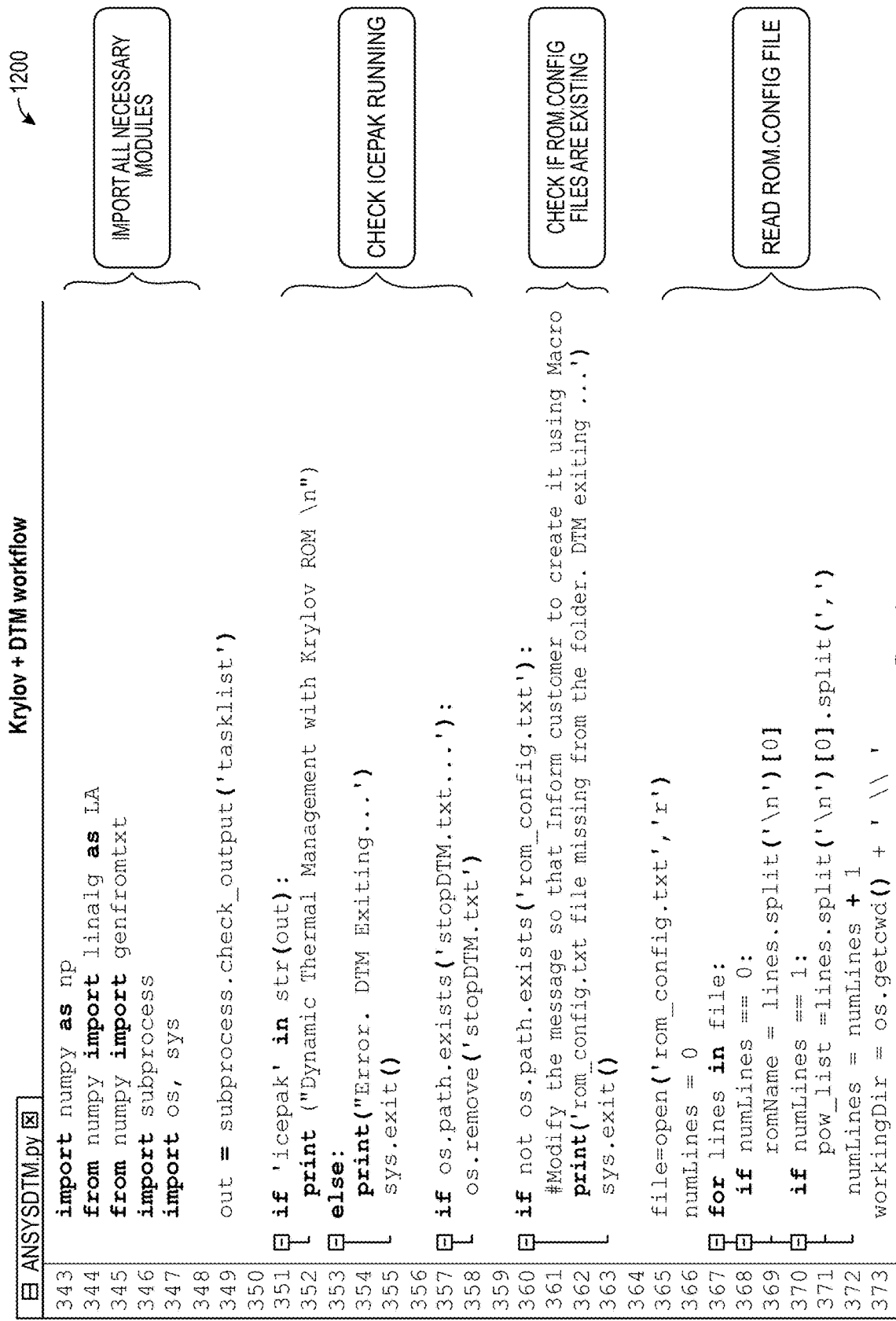
Figure 8B:
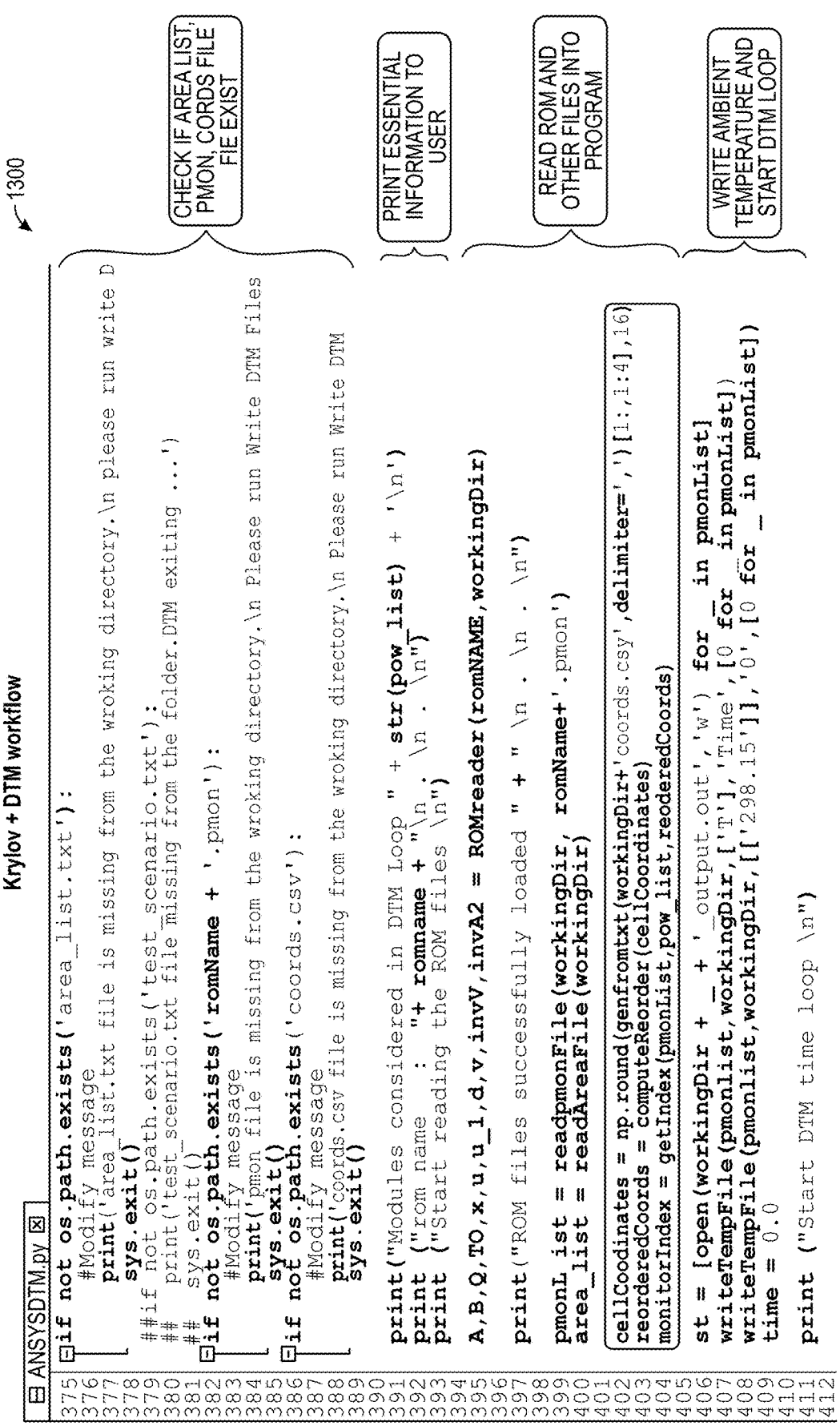

FIGS. 8A-8D are examples of Krylov and DTM workflow implemented using Python code according to one embodiment. For example, FIG. 8A illustrates the code 1200 where all necessary modules can be imported, Icepak can be checked, rom.config files can be checked, and rom.config. file can be read. FIG. 8B depicts the code 1300 where area list, pmon, coordinate file can be checked, essential information can be printed, ROM and other files can be read, ambient temperature can be written and DTM loop can be initiated. As illustrated in FIG. 8C, code 1400, when executed, can start user Python code, perform ROM evaluation to calculate the temperature based on the given power value, and output the field data per user request. As depicted in FIG. 8D, code 1500 upon execution can obtain essential details about the ROM and perform field evaluation and copy the files into the working directory.

Figure 9A:
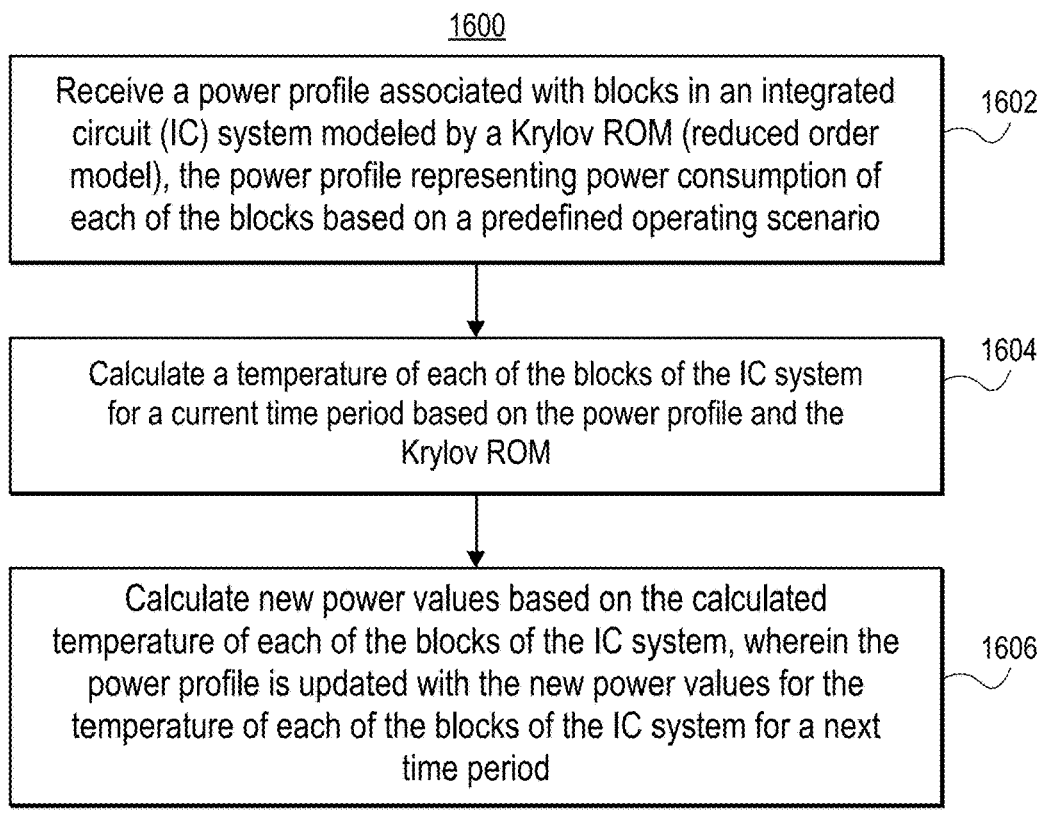
FIG. 9A-9B depict schematic diagrams illustrating an example method for a mechanism to perform dynamic thermal management (DTM) analysis according to one embodiment.

Now referring to FIG. 9A that shows an example of an embodiment of a DTM analysis method 1600 according to an embodiment. In operation 1602, the method can include receiving a power profile associated with blocks in an integrated circuit (IC) system modeled by a Krylov ROM (reduced order model). The power profile can represent power consumption of each of the blocks based on a predefined operating scenario. In operation 1604, the method can additionally include calculating the temperature of each of the blocks of the IC system for a current time period based on the power profile and the Krylov ROM. Further, in operation 1606, the method can include calculating new power values based on the calculated temperature of each of the blocks of the IC system. The power profile can be updated with the new power values for the temperature of each of the blocks of the IC system for a next time period. In one embodiment, the power profile associated with the blocks in the IC system can be received from a power profile manager (e.g., 302) implemented as a script (see FIG. 1) for a simulation of the IC system.

In one embodiment depicted in FIG. 6, for example, the power profile associated with the blocks in the IC system can be received from a power profile manager 1032 implemented as a script for a simulation of the IC system. As illustrated further in FIG. 6, the power profile manager 1032 can be coupled to a temperature generator 1012 via a data plug 1020.

Figure 9B:
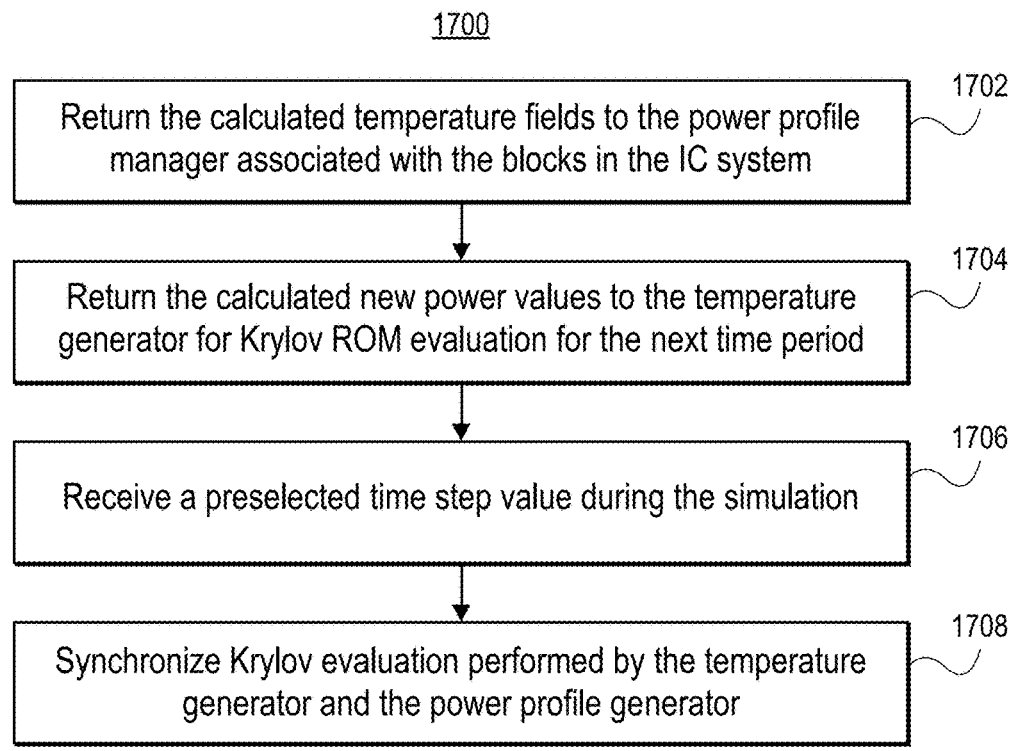

FIG. 9B illustrates an example of an embodiment of a DTM analysis method 1700. In operation 1702, the method can include returning, via the data plug, the calculated temperature fields to the power profile manager associated with the blocks in the IC system. In operation 1704, the method can additionally include returning, via the data plug, the calculated new power values to the temperature generator for Krylov ROM evaluation for the next time period. Further, in operation 1706, the method can include receiving, by the data plug, a preselected time step value during the simulation. Thereafter, in operation 1708, the method can include synchronizing, by the data plug, Krylov evaluation performed by the temperature generator and the power profile generator. The temperature generator and the power profile generator can have the same preselected time step value during the simulation.

In one embodiment a MDI (Multi-Die Integration) package model and a smartphone model can be merged for system level thermal analysis. A smartphone model can be imported based on the assumption or settings of a steady state and weak forced convection. Laminar flow can also be configured while ignoring radiation effects. Material property of each object can be predefined. Global mesh setup and Non-conformal (N/C) assembly for smartphone region can also be predefined to reduced CFD volume mesh count. An N/C assembly can be created to make non-conformal assembly of an MDI package for mesh setup. An N/C assembly can be created for local mesh refinement of a SoC package.

A Reduced Order Model (ROM) is a simplification of a high-fidelity dynamical model that preserves essential behavior and dominant effects, for the purpose of reducing solution time or storage capacity required for the more complex model. In one embodiment, Krylov ROM can be generated as a thermal reduced-order model based on Krylov model-order reduction technique. As depicted in FIG. 6, the inputs for a thermal ROM may include power (e.g., 1030) as a function of time, applied uniformly to certain regions of a device. Outputs of the thermal ROM may include calculated temperature (e.g., at block 1018) as a function of time, at certain points in space occupied by the device. In some embodiments, the Krylov ROMs can provide or yield temperatures at all cells in a computational mesh representing a chip or a device.

Once a ROM is generated (or constructed) (see FIG. 6), the generated ROM can be reused (or invoked to conduct evaluation) with different time-dependent heat-sources (e.g., power profile) and evaluation time-points. The generated ROM (e.g., at block 1008) can be used in real-time predictions of a simulation's results. In this manner, the generated ROM can be used to gain insights when a simulation's input variables are changed. The cost (e.g. computing resources or time required) to generate a ROM can be higher than to invoke the ROM to perform evaluation. However, the generation of ROM needs only to be done once. Therefore, the ROM can be particularly useful for solving the same model with many different heat-sources. By creating a ROM, changes can be made and analyzed in real-time simulations, decreasing simulation time by orders of magnitude. For some problems, constructing the ROM may not take a lot of time considering the possibility of changing several design parameters downstream. The accuracy of the ROM can be controlled (almost completely) by a single parameter: the ROM order. Increasing the order can increase the construction time and run time, linearly, and the running time, negligibly.

A Krylov ROM can be generated based on configuration received (e.g. input via a user interface) as illustrated in FIG. 6. For example, as depicted in block 1006, the received configuration can include power source selection (e.g. CPU, GPU, CP, and ISP). The received configuration can include solution settings such as convergence criteria for flow, energy, and Joule heating, etc. The configuration can also include an evaluation order (e.g., 5) and time versus power data (e.g., time/power pairs to define a piecewise-linear curve) for each power source. Example power values can be configured for each power source of different blocks. The amount of time (e.g., hours, days, etc.) required to construct or generate a Krylov ROM can depend on various factors, such as number of sources, order number, and number of volume mesh counts.

In one embodiment, DTM solving process can be performed according to instructions received (e.g. as a set of script codes in Python 500) for scenario setup. As illustrated in FIG. 3, the instructions can include specifications or definitions of power sources for a specific scenario (e.g. as a list of identifiers of IPs that are needed to be included in the DTM). Further, the instructions can include settings for DTM analysis such as minimum time, IP name, power for each IP, field data start and end time to output (or write) field data for time steps in between, frequency for data writing, put start time and end time for field data writing.

In one embodiment, the instructions (e.g. scripts) for DTM analysis can specify thermal management logic based on temperature of its IP's temperature, calculate the power of module based on temperature, and variable time step based on simulation time. The instructions can be executed (see FIG. 6) to invoke temperature calculation (e.g., by temperature generator 1012) and to calculate power of the module based on temperature (e.g., by Power profile generator 1032), write temperature/power (e.g., by Power profile generator 1032), and check if end time is reached.

As illustrated in block 306 in FIG. 1, results of the DTM analysis can include a plot of temperature history to indicate thermal management flow. A post processing of ROM evaluation can allow generation of temperature field for each time step to indicate, for example, power and temperature history of each IP block and hot-spot location.

According to another aspect, the above method can be embodied on a non-transitory computer-readable medium programmed with executable instructions that, when executed, perform the method. The instructions can be stored in nonvolatile memory such as flash memory or dynamic random access memory which is volatile or other forms of memory.

The methods and systems described herein may be implemented using any suitable processing system with any suitable combination of hardware, software and/or firmware, such as described below with reference to the non-limiting examples of FIGS. 10, 11A-11C.

Figure 10:
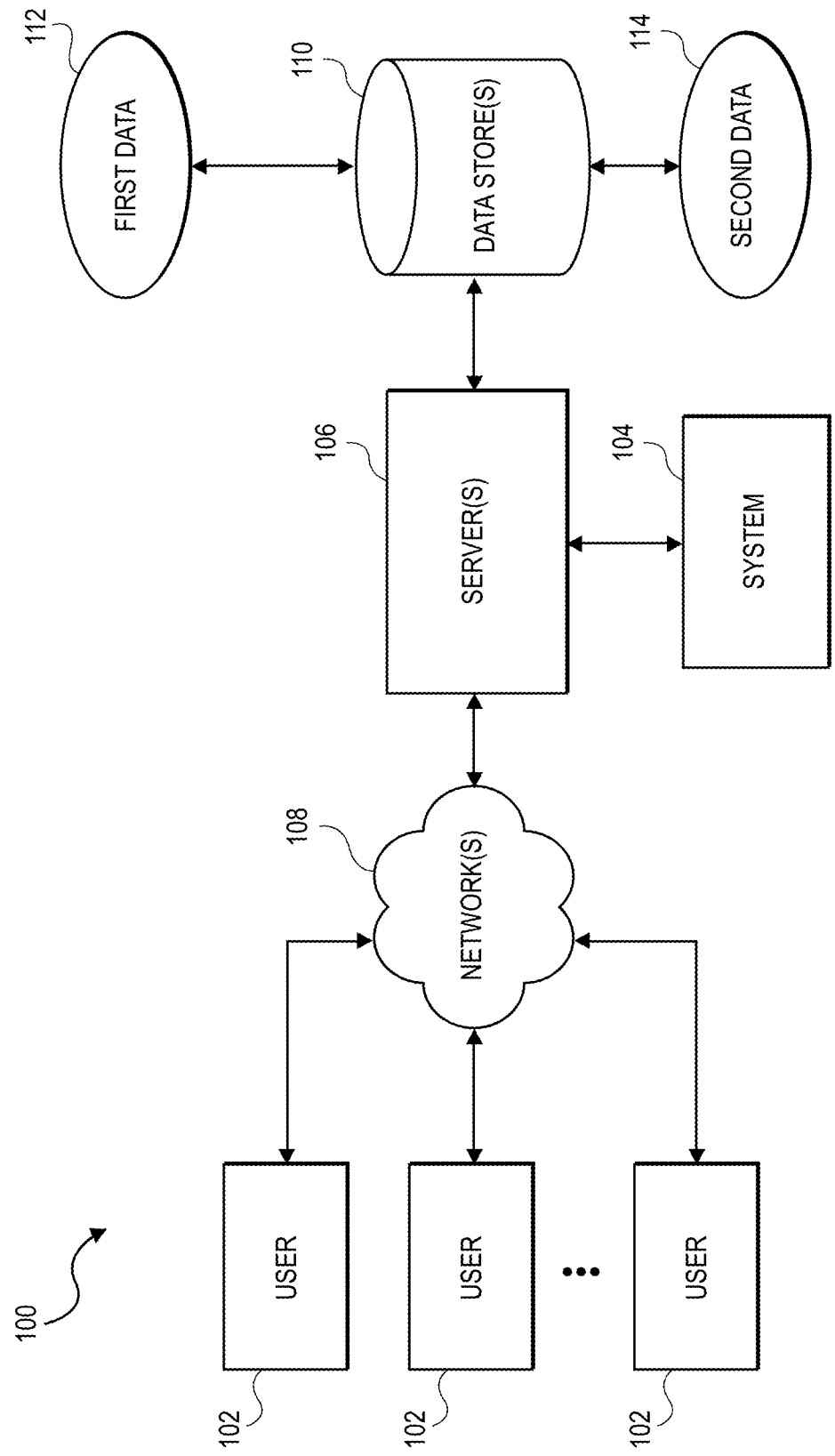
FIGS. 10, 11A-11C depict example systems which may be used in conjunction with the embodiments described herein.

FIG. 10 shows an example of a computer-implemented environment 100, which may be used with systems and methods described herein. For example, users 102 may interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 11A:
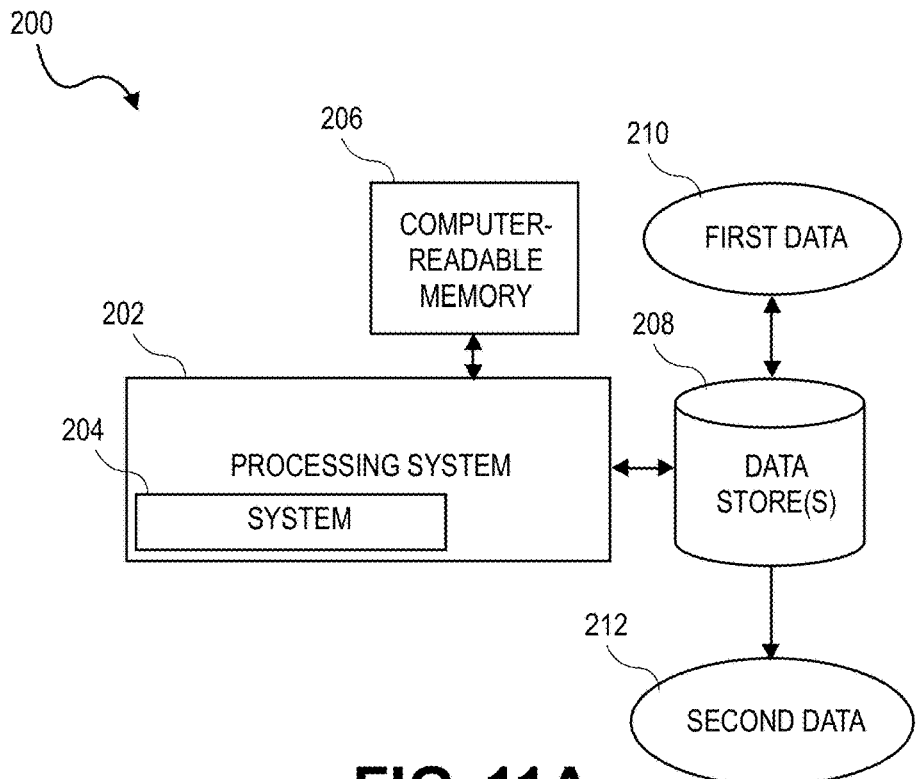
Figure 11B:
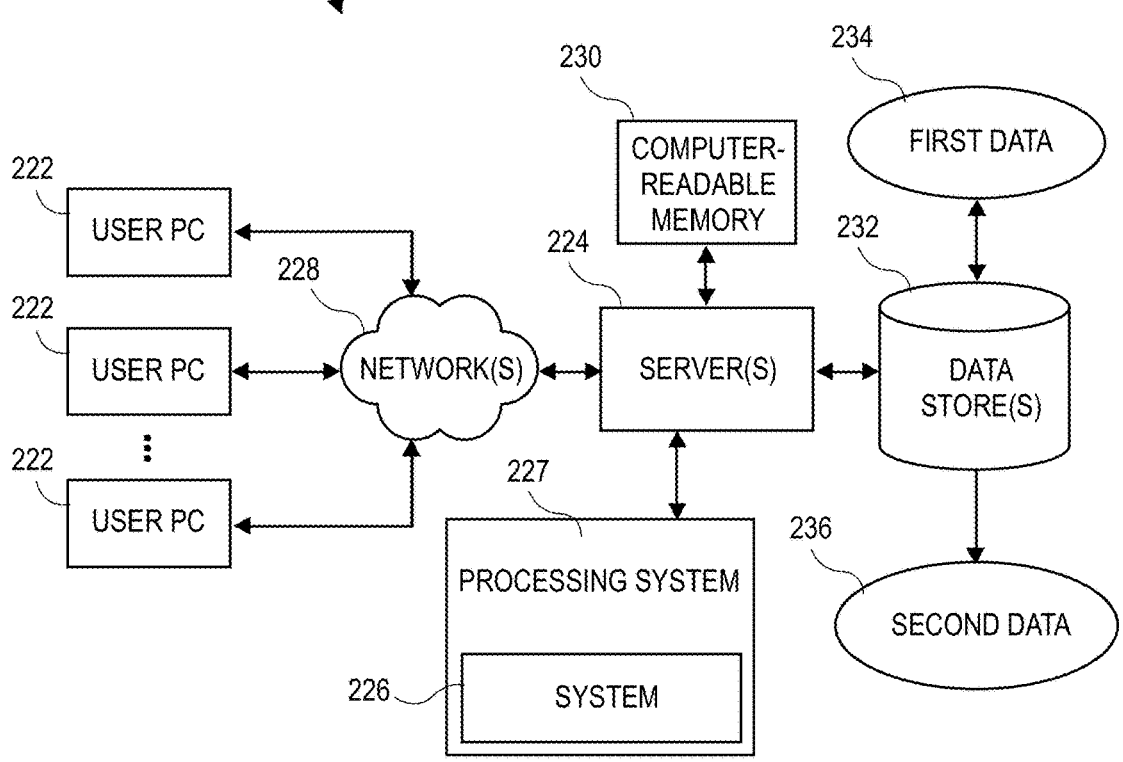
Figure 11C:
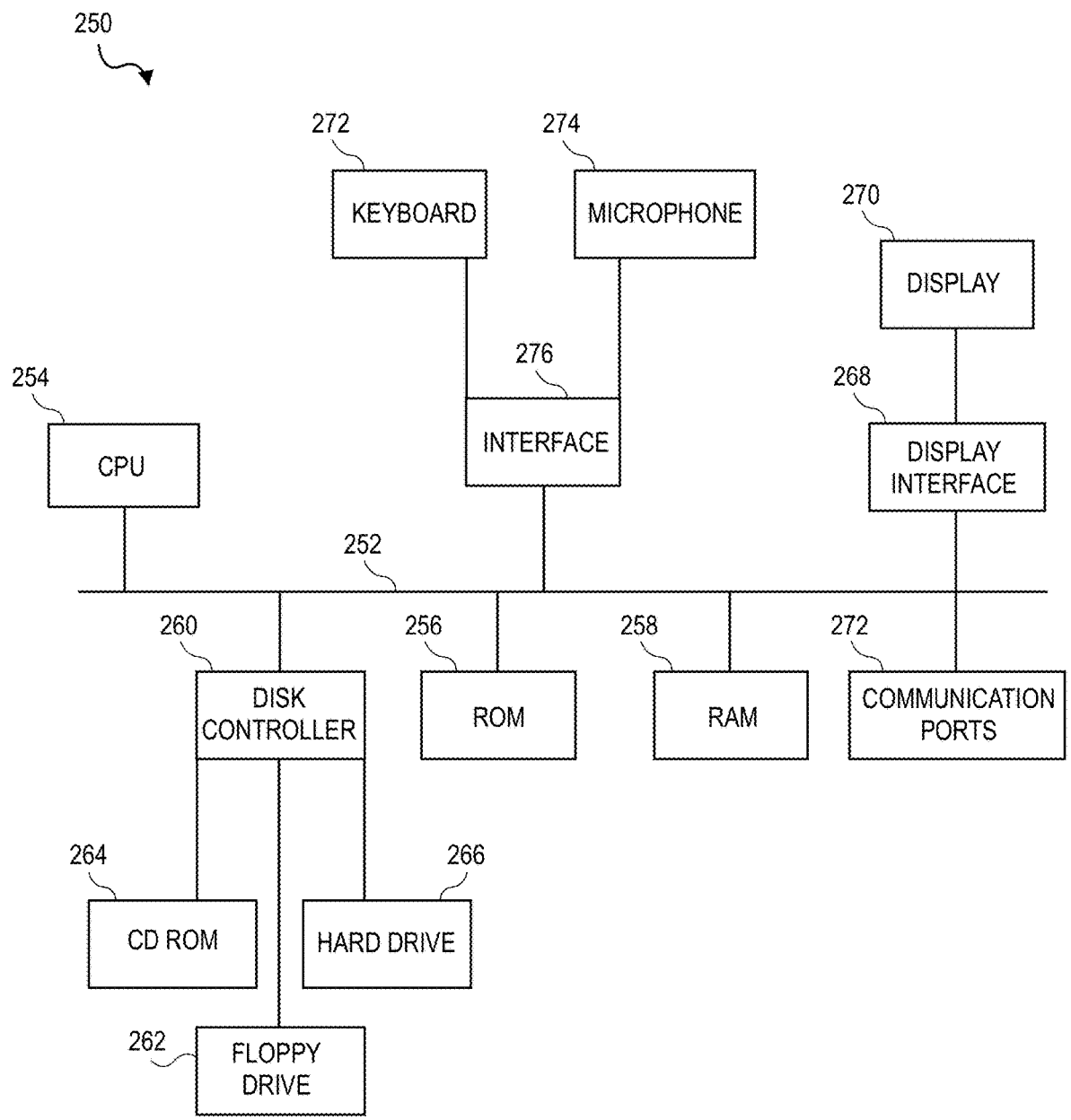

FIGS. 11A, 11B, and 11C show example systems for implementing the system and methods described herein. For example, FIG. 11A shows an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 11B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 11C shows a block diagram of exemplary hardware for a standalone computer architecture 250, such as the architecture depicted in FIG. 10, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the invention, but other variations fall within the scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer language may be used such as C, C++, Java, Python, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A computer-implemented method, comprising:
receiving a power profile associated with blocks in an integrated circuit (IC) system modeled by a Krylov ROM (reduced order model), the power profile representing power consumption of each of the blocks based on a predefined operating scenario;
calculating a temperature, by a temperature generator, of each of the blocks of the IC system for a current time period based on the power profile and the Krylov ROM, wherein a dynamic thermal management (DTM) platform includes the temperature generator and a data plug; and
calculating, by a power profile manager, new power values based on the calculated temperature of each of the blocks of the IC system, wherein the power profile is updated with the new power values for the temperature of each of the blocks of the IC system for a next time period, and wherein the data plug coordinates a communication between the DTM platform and the power profile manager.

2. The computer-implemented method, as in claim 1, wherein the power profile associated with the blocks in the IC system is received from the power profile manager implemented as a script for a simulation of the IC system, the power profile manager being coupled to the temperature generator via the data plug.

3. The computer-implemented method, as in claim 2, further comprising invoking a dynamic thermal management (DTM) workflow including the Krylov ROM to perform a DTM analysis to perform the simulation of the IC system and process the received power profile associated with the blocks in the IC system according to a Krylov ROM.

4. The computer-implemented method, as in claim 3, wherein the DTM analysis is performed according to predefined instructions, the predefined instructions including specifications of power sources for a predefined scenario and settings for the DTM analysis.

5. The computer-implemented method, as in claim 2, further comprising:
returning, via the data plug, the calculated temperature fields to the power profile manager associated with the blocks in the IC system; and
returning, via the data plug, the calculated new power values to the temperature generator for Krylov ROM evaluation for the next time period.

6. The computer-implemented method, as in claim 2, further comprising:
receiving, by the data plug, a preselected time step value during the simulation; and
synchronizing, by the data plug, Krylov evaluation performed by the temperature generator and the power profile generator, the temperature generator and the power profile generator having the same preselected time step value during the simulation.

7. The computer-implemented method, as in claim 6, wherein the generated Krylov ROM is reused with one or more different power profiles and simulation time-points.

8. The computer-implemented method, as in claim 6, wherein receiving, by the data plug, the preselected time step value during the simulation of the IC system includes:
checking the preselected time step configured for the simulation of the IC system;
determining whether a current time configured for the simulation of the IC system does not exceed an end time configured for the simulation of the IC system, the current time including the preselected time step, wherein the current time represents a time marching for a new power update and a next temperature calculation; and
in response to determining whether current time configured for the simulation of the IC system does not exceed the end time configured for the simulation of the IC system iteratively, performing the time marching for the new power update and the next temperature calculation until the simulation of the IC system reaches the end time.

9. The computer-implemented method, as in claim 1, wherein the calculating of the temperature comprises generating results that indicates thermal hot-spot locations of each of IP blocks of the IC system based on the received power profile associated with the blocks in the IC system from the power profile manager.

10. The computer-implemented method, as in claim 1, further comprising generating a plot of temperature and power history including temperature field for each time step of each IP block and hot spot location.

11. The computer-implemented method, as in claim 1, wherein the power profile includes time-dependent power values applied uniformly to selected regions of a device and the calculated temperature includes time-dependent temperatures of selected points in space occupied by the device.

12. The computer-implemented method, as in claim 1, wherein receiving the power profile associated with the blocks in the IC system modeled by the Krylov ROM includes:
   determine a power indicated in the power profile based on a temperature, a voltage, and a frequency, and wherein the temperature, the voltage, and the frequency are varied based on an increment of time.

13. A non-transitory machine readable medium storing executable program instructions which when executed by a data processing system cause the data processing system to perform a method comprising, the method comprising:
   receiving a power profile associated with blocks in an integrated circuit (IC) system modeled by a Krylov ROM (reduced order model), the power profile representing power consumption of each of the blocks based on a predefined operating scenario;
   calculating a temperature, by a temperature generator, of each of the blocks of the IC system for a current time period based on the power profile and the Krylov ROM, wherein a dynamic thermal management (DTM) platform includes the temperature generator and a data plug; and
   calculating, by a power profile manager, new power values based on the calculated temperature of each of the blocks of the IC system, wherein the power profile is updated with the new power values for the temperature of each of the blocks of the IC system for a next time period, and wherein the data plug coordinates a communication between the DTM platform and the power profile manager.

14. The medium, as in claim 13, wherein the power profile associated with the blocks in the IC system is received from the power profile manager implemented as a script for a simulation of the IC system, the power profile manager being coupled to the temperature generator via the data plug.

15. The medium, as in claim 14, wherein the method further comprises invoking a dynamic thermal management (DTM) workflow including the Krylov ROM to perform a DTM analysis to perform the simulation of the IC system and process the received power profile associated with the blocks in the IC system according to a Krylov ROM.

16. The medium, as in claim 15, wherein the DTM analysis is performed according to predefined instructions, the predefined instructions including specifications of power sources for a predefined scenario and settings for the DTM analysis.

17. The medium, as in claim 14, wherein the method further comprises:
   returning, via the data plug, the calculated temperature fields to the power profile manager associated with the blocks in the IC system; and
   returning, via the data plug, the calculated new power values to the temperature generator for Krylov ROM evaluation for the next time period.

18. The medium, as in claim 13, wherein the calculating of the temperature comprises generating results that indicates thermal hot-spot locations of each of IP blocks of the IC system based on the received power profile associated with the blocks in the IC system from the power profile manager.

19. The medium, as in claim 13, wherein the method further comprises:
   receiving, by the data plug, a preselected time step value during the simulation; and
   synchronizing, by the data plug, Krylov evaluation performed by the temperature generator and the power profile generator, the temperature generator and the power profile generator having the same preselected time step value during the simulation.

20. The medium, as in claim 19, wherein the generated Krylov ROM is reused with one or more different power profiles and simulation time-points.

21. The medium, as in claim 13, further comprising generating a plot of temperature and power history including temperature field for each time step of each IP block and hot spot location.

22. The medium, as in claim 13, wherein the power profile includes time-dependent power values applied uniformly to selected regions of a device and the calculated temperature includes time-dependent temperatures of selected points in space occupied by the device.

* * * * *